United States Patent [19]

Ramey

[11] Patent Number: 5,530,962
[45] Date of Patent: Jun. 25, 1996

[54] MEMORY CONTROL DEVICE FOR AN ASSAY APPARATUS

[75] Inventor: B. Edward Ramey, Durham, N.C.

[73] Assignee: AKZO Nobel N.V., Arnhem, Netherlands

[21] Appl. No.: 404,121

[22] Filed: Mar. 14, 1995

Related U.S. Application Data

[63] Continuation of Ser. No. 88,550, Jul. 9, 1993, abandoned.

[51] Int. Cl.⁶ ........................................... G06F 15/16
[52] U.S. Cl. ..................... 395/84; 395/80; 395/82; 395/98; 395/427; 365/228
[58] Field of Search .................... 395/80, 82, 84, 395/98, 425; 365/228

[56] References Cited

U.S. PATENT DOCUMENTS

| | | | |
|---|---|---|---|
| 4,511,985 | 4/1985 | Inaba et al. | 395/86 |
| 4,549,276 | 10/1985 | Inaba et al. | 395/88 |
| 4,595,989 | 6/1986 | Yasukawa et al. | 395/84 |
| 4,694,232 | 9/1987 | Suzuki et al. | 395/80 |
| 4,701,686 | 10/1987 | Kishi et al. | 318/632 |
| 4,814,969 | 3/1989 | Kiyooka | 395/85 |
| 4,841,450 | 6/1989 | Fredriksson | 395/84 |
| 4,860,191 | 8/1989 | Nomura et al. | 364/DIG. 1 |
| 4,862,379 | 8/1989 | Fujimoto | 364/474.11 |
| 4,920,572 | 4/1990 | Sugita et al. | 382/25 |
| 4,953,082 | 8/1990 | Nomura et al. | 364/DIG. 1 |
| 4,954,761 | 9/1990 | Kimura et al. | 395/80 |
| 4,975,856 | 12/1990 | Vold et al. | 395/98 |
| 5,025,390 | 6/1991 | Daggett | 318/568.2 |
| 5,093,552 | 3/1992 | Torii et al. | 219/121.83 |
| 5,093,607 | 3/1992 | Fujita et al. | 395/82 |
| 5,099,233 | 3/1992 | Keenan | 395/400 |
| 5,155,423 | 10/1992 | Karlen et al. | 395/80 |
| 5,156,053 | 10/1992 | Shiraishi | 73/849 |
| 5,260,872 | 11/1993 | Copeland et al. | 364/413.07 |
| 5,357,627 | 10/1994 | Miyazawa et al. | 395/575 |

OTHER PUBLICATIONS

DS2250 Soft Micro Stik data sheet, Dallas Semiconductor 1990–1991 Product Data Book, p. 145.

DS0010 Telservicing ToolBox 1.0 Software data sheet, Dallas Semiconductor 1990–1991 Product Data Book, pp. 886–887.

*Primary Examiner*—George B. Davis
*Attorney, Agent, or Firm*—Spencer & Frank

[57] ABSTRACT

A memory control arrangement includes a microcontroller for performing a program memory operation and a data memory operation. The microcontroller produces address signals and a control output indicating first and second operating conditions. A program memory having a first range of memory locations stores a first program and is connected to the address lines for being addressed by the microcontroller. A data memory has second and third ranges of memory locations for storing, respectively, a second program and data for use by program variables. The data memory is connected to the address lines for selectively addressing the second and third ranges of memory locations by the address signals from the microcontroller. A memory range controller is coupled to the control output of the microcontroller for receiving the control signal and is responsive to the first operating condition indicated by the control signal for coupling the address signals to the first range of memory locations in the program memory during the program memory operation of the microcontroller and to the third range of memory locations in the data memory during the data memory operation of the microcontroller. The memory range controller is further responsive to the second operating condition indicated by the control signal for coupling the address signals to the second range of memory locations in the data memory during the program memory operation of the microcontroller and to the third range of memory locations in the data memory during the data memory operation of the controller.

17 Claims, 3 Drawing Sheets

MEMORY CONTROL DEVICE FOR AN ASSAY APPARATUS

This application is a continuation of application Ser. No. 08/088,550, filed Jul. 9, 1993, now abandoned.

BACKGROUND OF THE INVENTION

1. Field of the Invention

The present invention relates to a memory control device for a bioassay apparatus and, more particularly, to a memory control device for an embedded microcontroller of a bioassay apparatus for allowing convenient changes to stored programs for controlling a robotic arm associated with the embedded controller.

An example of an automated blood/plasma sampling system for which the present invention is applicable is disclosed, for example, in U.S. patent application Ser. No. 07/833,951 to Hulette et al., filed Feb. 11, 1992, which is a continuation-in-part application of U.S. patent application Ser. No. 07/443,951, filed Dec. 1, 1989, now abandoned. The subject matter of the continuation-in-part application to Hulette et al. is incorporated herein by reference. An example of a piercing and sampling probe is disclosed in U.S. patent application Ser. No. 07/874,371 filed Apr. 27, 1992, by Moreno. The subject matter of the application to Moreno is incorporated herein by reference. Another example of a sampling probe is disclosed in U.S. Pat. No. 5,178,019, issued Jan. 12, 1993, to Keiter. The subject matter of the patent to Keiter is incorporated by reference herein. An example of a liquid level sensor and control circuit for sensing a position of a probe with respect to a surface of a liquid in a container is disclosed in a U.S. patent application Ser. No. 08/088,656, to Ramey et al. filed concurrently with the present application. The subject matter of the application to Ramey et al. is incorporated by reference herein. The subject matter of the applications to Hulette et al., to Moreno and to Ramey et al., and the patent to Keiter are each assigned to the same assignee as that of the present application.

2. Description of the Related Art

Automated sample handling systems are known which automatically dispense fluid samples, such as blood plasma and reagents, into a reaction well of a cuvette. Such instruments are useful in the field of biochemical analysis for measuring blood clotting times and for automatically carrying out other bioassays. Additionally, these instruments are useful in the field of chemical assays for automatically carrying out chemical assays. An example of an automated sample handling system for carrying out blood and plasma bioassays is described in U.S. patent application Ser. No. 07/443,951 to Hulette et al.

In this particular system, fluid samples, such as blood or plasma, are stored in containers, such as test tubes, which are vacuum sealed by way of a rubber septum that must be pierced in order to withdraw a measured amount of the sample for testing purposes. U.S. patent application Ser. No. 07/874,371 to Moreno, incorporated herein by reference, discloses an example of a piercing and sampling probe suitable for piercing and sampling a measured amount of liquid.

The Hulette et al. system also includes a temperature controlled housing provided for storing fluid samples and reagents at a relatively cool temperature for preventing degradation of the samples and reagents prior to sample analysis. The temperature controlled housing typically maintains the fluid samples and reagents at a temperature of 10° C. The actual analyses are generally carried out at 37° C. (98.6° F.), standard human body temperature. Accordingly, it is necessary to heat the fluid sample and reagents to 37° C. prior to analysis. U.S. Pat. No. 5,179,019 to Keiter, incorporated herein by reference, discloses a sample probe device useful for heating fluid samples and reagents prior to analysis.

The piercing and sampling probes in the Hulette et al. system are raised and lowered in operation by a robotic arm under control of an embedded controller which maneuvers a sample probe between reagent containers and a reaction cuvette for automatically aspirating and dispensing reagents. The embedded controller is responsive to a sensor circuit for detecting the surface of a liquid, whether a sample or reagent, for accurately controlling movement of the probe. Details of a sensor circuit for detecting the surface of a liquid are disclosed in the application to Ramey et al. Ser. No. 08/088,656.

Specific maneuvering of the robotic arm for positioning the probe may vary depending on the particular bioassay effected by the automatic sampling system. Examples of variations could be a particular sequence of probe positions, sample temperature or sample heating time, and sample volume. Consequently, program instructions executed by the embedded controller may also vary from particular bioassay to bioassay. In some cases, variations in bioassay operations require customization or empirical determination.

Thus, for embedded controllers in an automated blood/plasma sampling system such as the one disclosed by Hulette et al., it is advantageous to alter program instructions stored in a program memory associated with the embedded controller without physically accessing and replacing the program memory. This allows program instructions executed by the embedded controller to be conveniently changed by downloading a program file from a host computer, saving the time and effort normally associated with removing program memory of the embedded controller from the instrument for replacement. It is also advantageously possible to remotely update the firmware from a centrally located main computer system through a modem or network connection.

SUMMARY OF THE INVENTION

The present invention provides a convenient way for altering program instructions stored in a memory associated with an embedded controller of an automated blood/plasma sampling system. Moreover, the present invention allows program instructions to be changed without physically accessing the memory storing the instructions. Another advantage of the present invention is that program instructions can be downloaded from a remotely located main computer.

The above and other objects of the invention are accomplished by the provision of an embedded controller for an assay apparatus including a microcontroller configured for controlling an operation of a robotic arm, the microcontroller producing a plurality of address signals for addressing a plurality of ranges of memory locations and a control signal for indicating a first operating condition and a second operating condition; a program memory, coupled to the plurality of address signals and including a first range of memory locations addressed by a first predetermined number of the plurality of address signals, for storing data configuring the microcontroller for controlling the operation of the robotic arm; a data memory, coupled to the plurality of address signals and including a second range of memory locations addressed by a second predetermined number of the plurality of address signals, for storing data configuring the microcontroller for controlling operations of the robotic arm and data related to the operation of the robotic arm, the second range of memory locations overlapping the first range of memory locations and including a third range of memory locations corresponding to the first range of memory locations and addressed by the first predetermined number of the plurality of address signals; and a memory range controller, responsive to the control signal, for enabling the microcontroller to address the first range of memory locations in the program memory during the first operating condition and enabling the microcontroller to address the third range of memory locations in the data memory during the second operating condition.

Preferably, the embedded controller further includes an interface circuit coupled to the microcontroller for receiving data from a host computer for configuring the microcontroller for controlling the robotic arm and the memory range controller is responsive to the control signal for enabling the microcontroller to address the third range of memory locations in the data memory for storing the data received from the host computer.

Moreover, the program memory according to the present invention is preferably a nonvolatile memory and a battery is coupled to the data memory for retaining data configuring the microcontroller for controlling the robotic arm and data related to the operation of the robotic arm when the microcontroller is in a power off state. The robotic arm associated with the microcontroller includes a sensor for producing a first position signal indicating a position of the robotic arm, and the embedded controller includes a receiver circuit responsive the first position signal for providing a second position signal to the microcontroller for controlling the operation of the robotic arm. Preferably, the receiver circuit is an analog-to-digital converter circuit.

According to another aspect of the present invention, the above and other objects of the invention are accomplished by the provision of an embedded controller for controlling a robotic arm of an assay apparatus including a processor for controlling an operation of the robotic arm, the processor having a first operating condition and a second operating condition; a memory, coupled to the processor, for storing data configuring the processor for controlling the operation of the robotic arm in a first memory area, and for storing data configuring the processor for controlling the operation of the robotic arm and data related to the operation of the robotic arm in a second memory area, the second memory area overlapping the first memory area and having a third memory area corresponding to the first memory area; and a memory control device responsive to the first operating condition for enabling the processor to access the first area of the memory during the first operating condition and responsive to the second operating condition for enabling the processor to access the third memory area in the second memory area in the memory during the second operating condition.

Preferably, the embedded controller according to the present invention includes a communication device coupled to the processor for receiving data from a host processor for configuring the processor for controlling the robotic arm. The memory control device is responsive to the first operating condition for enabling the processor to access the third memory area in the memory for storing the data received from the host processor.

The first area of the memory is also preferably nonvolatile and includes a battery coupled to the memory for retaining data configuring the processor for controlling the robotic arm and data related to the operation of the robotic arm when the processor is in a power off state.

Further, the embedded controller according to the present invention also preferably includes an arm position indication device for providing a position signal corresponding to a position of the robotic arm, and signal conditioning device, responsive to the position signal, for providing a position indication signal to the processor. Preferably, the signal conditioning device provides a digital indication signal to the processor.

BRIEF DESCRIPTION OF THE DRAWINGS

A preferred embodiment of the invention will be described in conjunction with the accompanying drawings, wherein.

DETAILED DESCRIPTION OF THE INVENTION

An automated blood/plasma sampling system according to the present invention typically includes several modules, each having an embedded controller and a robotic arm for performing various assay-related functions on blood samples. FIG. 1 shows a schematic block diagram of a preferred embodiment of an embedded controller for an automated blood/plasma sampling and assay system having a memory control device according to the present invention, while also showing the relationship of the embedded controller to various components of the sampling system, such as a host computer of the sampling system and a robotic arm. The host computer system typically controls the overall operation of the assay system and provides an interface between the various modules and external stimulus, such as an operator or a remotely located main computer system.

Figure 1A:
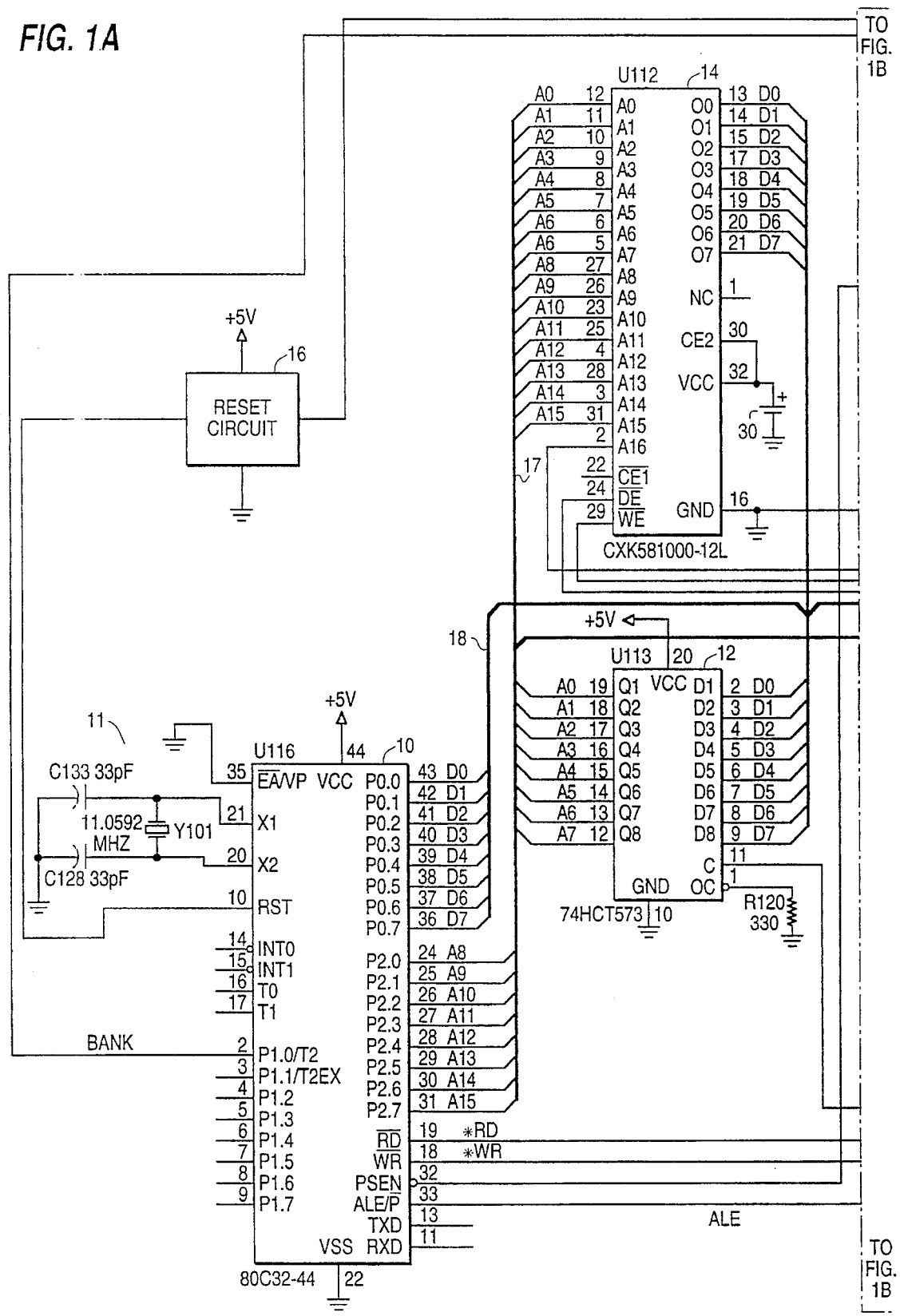
FIGS. 1A and 1B show a schematic block diagram of a preferred embodiment an embedded controller for an automated blood/plasma sampling system and its relation to various components of the sampling system.
Figure 2:
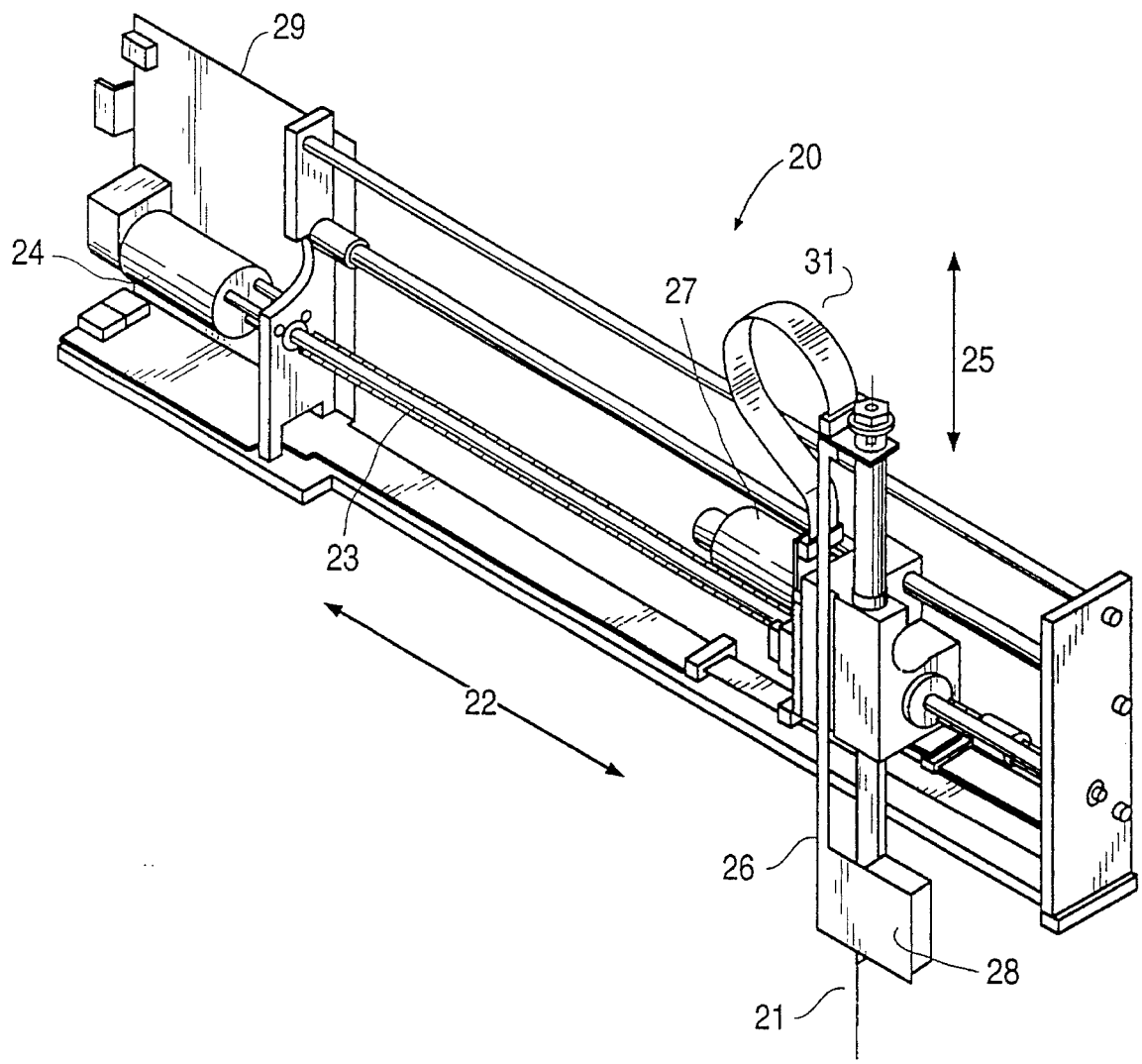
FIG. 2 shows a preferred arrangement of robotic arm associated with an embedded controller of the present invention.

In FIG. 1A, microcontroller 10 is arranged to control robotic arm 20 FIG. 2). FIG. 2 is a perspective view generally showing a preferred embodiment of robotic arm 20 including a probe 21. Robotic arm 20 maneuvers probe 21 horizontally and vertically for taking a measured volume of liquid from a liquid reservoir (not shown) or dispensing it to a reaction cuvette (not shown). Probe 21 can be a sampling probe, or a piercing and sampling probe for piercing rubber caps used to seal medical sample collection tubes, such as that disclosed in the previously mentioned application to Moreno. When probe 21 is a piercing sampling probe, it is preferably sharpened in accordance with the piercing probe disclosed in the previously mentioned application to Moreno. Moreover, when probe 21 is a piercing sampling probe, it is adapted for detecting the surface of a liquid in a container when piercing the cap of the container. Probe 21 senses a liquid-air interface of a conductive liquid in the container, such as blood or plasma, while probe 21 moves into the container for accurately positioning probe 21 with respect to the surface of the liquid.

Probe 21 is controllably moved along a horizontal axis 22 by lead screw 23 driven by horizontal lead screw motor 24. Vertical movement for raising and lowering probe 21 along axis 25 is provided by gear rack 26 driven by vertical motor 27 and a pinion assembly (not shown). Motors 24 and 27 are each selectively controlled by signals received from associated motor controllers 50 and 60, respectively. Liquid level sensor circuitry 40 (FIG. 1B) is coupled to probe 21 for sensing a liquid-air interface.

An example of a liquid level sensor circuit that may be used to implement circuit 40 is disclosed in the aforementioned Ramey et al. application Ser. No. 08/088,650, incorporated by reference herein.

Figure 1B:
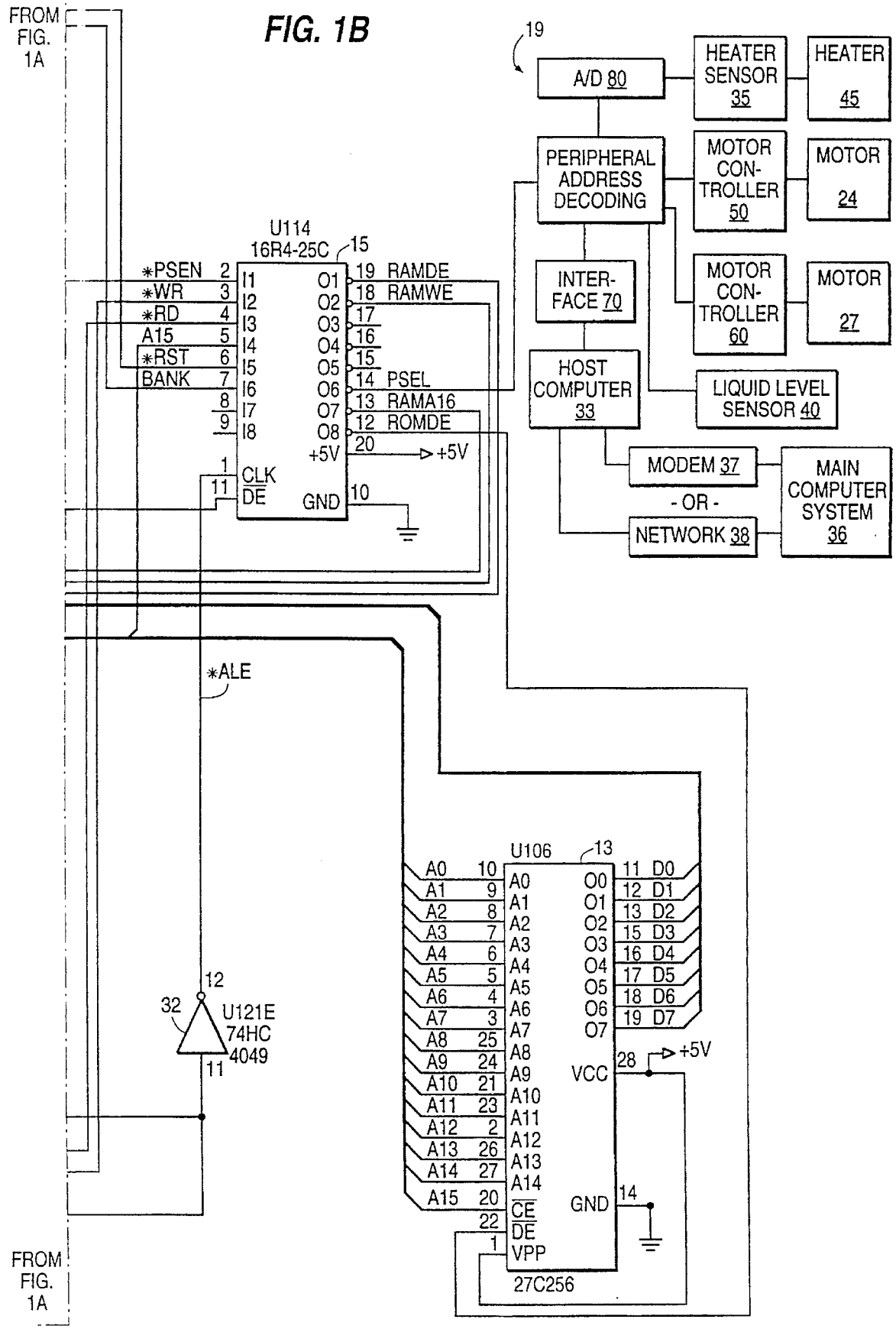

As previously mentioned, it is desirable in certain applications to heat the reagent in probe 21 while the probe is moved by robotic arm 20 toward a cuvette where the reagent is dispensed. In these applications, probe 21 is provided with an optional heaters 45 (FIG. 1B).

In the preferred embodiment, one portion of liquid level sensor circuitry 40 is located on a printed circuit board mounted to a rack assembly holding probe 21 at 28 in FIG. 2. Another portion of circuitry 40 is located on a printed circuit board mounted at 29 where the circuitry of the embedded controller is located. Of course, the embedded controller circuitry and the liquid level sensor circuitry can be located together on a single printed circuit board.

The embedded microcontroller is a two-axis arm controller, that is, microcontroller 10 and the two motor controllers 50 and 60 monitor and control the horizontal position of the rack assembly holding probe 21 and the vertical position of probe 21 with respect to, for example, the surface of a liquid. Microcontroller 10 and motor controller 60 correlate the position of probe 21 with signals received from liquid level sensor circuit 40 for determining the height of the liquid within a container. Flex cables 31 couple electrical signals between various portions of the control system according to the present invention. As previously mentioned, probe 21 can also be fitted with a heating coil (heater 45) for preheating sampled fluids prior to dispensing into a reaction chamber.

Referring again to FIG. 1A, microcontroller 10 is coupled to a clock oscillator circuit 11 which generates a clock signal for operating microcontroller 10. Microcontroller 10 can be any commercially available microprocessor or microcontroller, such as an Intel 80C32 microcontroller. The frequency of the clock signal generated by clock oscillator circuit 11 is suitably selected for operating microcontroller 10.

Microcontroller 10 is also coupled to nonvolatile memory 13 and data memory 14 through an address bus 17 and a data bus 18 (Harvard architecture). Preferably, address bus 17 is a 16-bit bus and data bus 18 is an 8-bit bus. An address buffer 12 is coupled to address bus 17 in the preferred embodiment for latching the eight least significant address bits because the 80C32 microcontroller shares the 8 bit data bus with the low order 8 bits of the address bus. That is, only the eight most significant address bits are dedicated address output terminals, the terminals for the eight least significant address bits dual as terminals for the eight data bits. Consequently, the eight least significant address bits are latched during a memory address cycle freeing the same eight terminals for data transfer. Of course, a different commercially available microcontroller having 16 or more address output terminals and separate bus terminals would make buffer 12 unnecessary.

Nonvolatile memory 13 stores program instructions for configuring microcontroller 10 for controlling robotic arm 20 (FIG. 2). Nonvolatile memory 13 can be a commercially available read only memory (ROM), such as a programmable ROM. Preferably, memory 13 is a 32-Kbyte commercially available 27C256 electronically programmable ROM (EPROM). Data memory 14 stores program instructions for configuring microcontroller 10 for controlling robotic arm 20, while also storing data related to the operation of robotic arm 20. Microcontroller 10 accesses data stored in data memory 14 for both writing data and reading data. Data memory 14 can be a commercially available random access memory (RAM), preferably a 128-Kbyte CXL581000-12L static RAM. Battery 30 is coupled to the data memory 14 for powering data memory 14 so that stored program instructions and data are retained when microcontroller 10 is in a power off state.

Microcontroller 10 is coupled to memory controller 15 through address bus 17, a first control signal address latch enable (ALE) and a second control signal BANK. The ALE control signal is coupled to buffer 12 for latching the eight least significant address bits output from microcontroller 10, and to memory controller 15 through an inverter 32. The BANK control signal is coupled to memory controller 15 for controlling memory bank switching. Memory controller 15 can be embodied as a programmed logic device (PLD) or as discrete logic components. In the preferred embodiment, memory controller 15 is clocked by the ALE control signal, forcing memory bank switching to occur at the beginning of a memory access cycle of microcontroller 10.

The sixteen lines of address bus 17 allow microcontroller 10 to access up to 64-Kbytes of memory, that is, hexadecimal memory locations 0000-FFFF. Control signal PSEN in conjunction with the sixteen address lines allows microcontroller 10 to access a full 28-Kbytes of memory, that is, hexadecimal memory locations 00000-1FFFF. Control signal BANK allows microcontroller 10 to implement a memory bank switching scheme to access 128-Kbytes of memory in one of two banks of memory. The first memory bank is provided by the 32-Kbytes of nonvolatile memory 13 configured as a lower 32-Kbytes of memory between hexadecimal locations 0000-7FFF (in program memory) and the lower 64-Kbytes of the 128-Kbytes of data memory 14 between hexadecimal locations 0000-FFFF (of data memory), while the second bank is provided by the entire 128-Kbytes of data memory 14 occupying both program and memory space. Of course, additional nonvolatile memory can be included with memory 13 at hexadecimal locations 8000-FFFF to provide a full 64-Kbytes of program memory.

Memory controller 15 also allows microcontroller 10 to access peripheral components 19 associated with robotic arm 20, such as, for example, motor controllers, position sensors, analog voltage monitors, or a liquid level sensor, or peripheral components for communication with host computer 33. Particular memory locations for the various peripheral components are mapped into the data memory space by appropriate address decoding. In a preferred embodiment, peripheral components addressed by microcontroller 10 include an analog-to-digital converter 80 coupled to a sensor 35 for sample heater 45, motor controllers 50 and 60, and interface 70 for communicating with host computer 33.

In an operating condition when the ALE is active and the BANK control signals is a logical low level, memory controller 15 enables microcontroller 10 to address nonvolatile memory 13, accessing the 32-Kbytes of memory in nonvolatile memory 13 and the lower 64-Kbytes of memory 14. When the ALE control signal is active and the BANK control signal is a logical high level, memory controller 15 enables microcontroller 10 to address both the lower and the upper 64-Kbytes of data memory 14 and peripheral components 19 which are mapped into this memory space.

When the ALE control signal is active and the BANK control signal is a logical high level, memory controller 15 enables microcontroller 10 to address both the lower and the upper 64-Kbytes of data memory 14. When the ALE active and the BANK control signal is a logical high level, memory controller 15 enables microcontroller 10 to address the upper 64-Kbytes of data memory 14 and peripheral components 19 mapped into this memory space.

Following a power-on reset condition, microcontroller 10 executes program instructions stored in program memory 13. Initially, microcontroller 10 executes program instructions providing module diagnostics normally associated with a power-on reset of a microcontroller, or microprocessor, then executes program instructions for performing an integrity check operation on data stored in the lower 64-Kbytes of data memory 14. If the integrity check indicates that data stored in data memory 14 is invalid, microcontroller 10 executes program instructions stored in program memory 13 for requesting a data transfer from the host computer. If the integrity check operation indicates that the data in data memory 14 is valid, microcontroller 10 executes program instructions stored in program memory 13 for memory bank switching.

Data transferred from host computer 33 in response to a request from microcontroller 10 is stored in the lower 64-Kbytes of data memory 14. Microcontroller 10 again executes the program instructions for the integrity check operation to determine the integrity of the transferred and stored data. If the integrity is bad, the transfer is repeated with a further integrity check. If the integrity is good, microcontroller 10 executes program instructions for memory bank switching.

Memory bank switching involves microcontroller 10 setting the BANK control signal to a logical high level. In response, memory controller 15 enables microcontroller 10 to access the lower 64-Kbytes of data memory 14 by remapping the lower 64-Kbytes of the memory space of microcontroller 10 to appear as program memory 13 to microcontroller 10. Immediately after bank switching, microcontroller 10 moves the data transferred from host computer 33 and stored in the upper 64-Kbytes of data memory 14 to the lower 64-Kbytes of data memory 14. Execution of normal operational and assay-related program instructions then begins.

Upon receipt of a command from host computer 33, controller 10 executes program instructions stored in program memory 13 for configuring microcontroller 10 to receive program instructions transferred from host computer 33 and store the received program instructions in data memory 14. A data integrity check is performed and, if indicated as good, controller 10 remaps the program memory space to data memory 14 by setting control signal BANK to a logical high level.

Using the memory bank switching capability of the present invention, changes in program instructions can be easily implemented without physical access to program memory 13. For example, changes in program instructions can be effected locally at host computer 33 of the automated blood/plasma sampling system, or remotely from a central host computer system 36 coupled to the automated sampling system via a modem 37 or network connection 38. Typical changes to the program instructions may include revision updates, sequence changes for positions of robotic arm 20 (FIG. 2) for particular bioassays, or temporary changes for diagnostic procedures for the automated blood/plasma sampling system.

While there have been described what are presently believed to be the preferred embodiment of the invention, it will be apparent to one skilled in the art that numerous changes can be made in the structure, proportions and conditions set forth in the foregoing embodiments without departing from the invention as described herein and as defined in the appended claims.

What is claimed is:

1. A memory control arrangement, comprising:
   a microcontroller for performing a program memory operation and a data memory operation and including address lines for producing address signals and a control output for producing a control signal for indicating a first operating condition and a second operating condition;
   a program memory having a first range of memory locations for storing a first program and connected to the address lines for being addressed by the address signals from the microcontroller;
   a data memory having second and third ranges of memory locations for storing, respectively, a second program and data for use by program variables, the data memory being connected to the address lines for selectively addressing the second and third memory range locations by the address signals from the microcontroller; and
   a memory range controller coupled to the control output of the microcontroller for receiving the control signal, said memory range controller being responsive to the first operating condition indicated by the control signal for coupling address signals to the first range of memory locations in the program memory during the program memory operation of the microcontroller and to the third range of memory locations in the data memory during the data memory operation of the microcontroller, and the memory range controller being responsive to the second operating condition indicated by the control signal for coupling address signals to the second range of memory locations in the data memory during the program memory operation of the microcontroller and to the third range of memory locations in the data memory during the data memory operation of the microcontroller.

2. The memory control arrangement according to claim 1, further comprising an interface circuit coupled to the microcontroller for transferring the second program from a host computer into the second range of memory locations of the data memory.

3. The memory control arrangement according to claim 2, wherein the memory range controller is further responsive to the first operating condition for enabling the microcontroller to address the second range of memory locations in the data memory for storing the second program received from the host computer.

4. The memory control device according to claim 1, wherein the program memory is a nonvolatile memory.

5. The memory control arrangement according to claim 1, further comprising a battery coupled to the data memory for retaining the second program and the data when the microcontroller is in a power off state.

6. The memory control arrangement according to claim 1, further comprising a sensor for producing a first position signal indicating a position of a robotic arm, and a receiver circuit for receiving the first position signal for providing a second position signal to the microcontroller and for controlling an operation of the robotic arm.

7. The memory control arrangement according to claim 1, wherein the microcontroller selectively uses one of the first program stored in the program memory and the second program stored in the data memory for controlling an operation of a robotic arm.

8. The memory control arrangement according to claim 1, wherein the program memory comprises a read only memory and the data memory comprises a random access memory, and the memory range controller is operatively connected to the random access memory to permit the second program to be written into the second range of memory locations of the random access memory from a remote source.

9. A memory control arrangement comprising:

a processor for performing a program operation and a data operation and including a control output for indicating a first operating condition and a second operating condition;

a memory, coupled to the processor, for storing a first program in a first memory area, for storing a second program in a second memory area, and for storing data for use by program variables in a third memory area, the first, second and third memory areas being respectively different memory areas; and a memory control device receiving the control output of the processor and being responsive to the first operating condition of the control output of the processor for enabling the processor to access the first program in the first memory area during the program operation of the processor and to access the data in the third memory area during the data operation of the processor, and the memory control device being responsive to the second operating condition of the control output of the processor for enabling the processor to access the second program in the second memory area during the program operation of the processor and to access data in the third memory area during a data operation of the processor.

10. The memory control arrangement according to claim 9, further comprising a communication device coupled to the processor for receiving the second program from a host processor.

11. The memory control arrangement according to claim 10, wherein the memory control device is responsive to the first operating condition of the control output of the processor for enabling the processor to address the second memory area in the memory for storing the second program data received from the host processor.

12. The memory control arrangement according to claim 9, wherein the first memory area comprises a nonvolatile memory.

13. The memory control arrangement according to claim 9, further comprising a battery coupled to the memory for retaining the second program and the data when the processor is in a power off state.

14. The memory control arrangement according to claim 9, further comprising:

a robot arm position indication means for outputting a position signal corresponding to a position of a robotic arm, and a signal conditioning means, for receiving the position signal and for providing a position indication signal to the processor.

15. The memory control arrangement according to claim 14, wherein the signal conditioning means provides a digital indication signal to the processor.

16. The memory controller arrangement according to claim 9, wherein the processor uses the program in one of the first and second memory areas for controlling the operation of the robotic arm.

17. The memory control arrangement according to claim 9, wherein the memory comprises a read only memory containing the first memory area for storing the first program and a random access memory containing the second and third memory areas for storing, respectively, the second program and the data, and the memory control device is operatively connected to the random access memory to permit the second program to be written into the second memory area of the random access memory from a remote source.

* * * * *